US009929855B2

(12) United States Patent
Ruffini et al.

(10) Patent No.: US 9,929,855 B2
(45) Date of Patent: Mar. 27, 2018

(54) SYNCHRONIZING CLOCKS IN A COMMUNICATIONS NETWORK

(71) Applicant: Telefonaktiebolaget L M Ericsson (publ), Stockholm (SE)

(72) Inventors: Stefano Ruffini, Pisa (IT); Michael Breschel, Lund (SE); János Harmatos, Budapest (HU); György Miklós, Budapest (HU); Magnus Sandgren, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 93 days.

(21) Appl. No.: 14/895,162

(22) PCT Filed: Oct. 2, 2015

(86) PCT No.: PCT/EP2015/072877
§ 371 (c)(1),
(2) Date: Dec. 1, 2015

(87) PCT Pub. No.: WO2017/054891
PCT Pub. Date: Apr. 6, 2017

(65) Prior Publication Data
US 2017/0195110 A1 Jul. 6, 2017

(51) Int. Cl.
*H04L 7/00* (2006.01)
*H04W 56/00* (2009.01)
(Continued)

(52) U.S. Cl.
CPC .......... *H04L 7/0016* (2013.01); *H04W 56/00* (2013.01); *H04W 56/0015* (2013.01); *H04J 3/0667* (2013.01); *H04W 84/20* (2013.01)

(58) Field of Classification Search
CPC ....... H04L 7/0008; H04L 7/0016; H04L 9/12; H04J 3/0667
(Continued)

(56) References Cited

U.S. PATENT DOCUMENTS

| 5,960,355 A | * | 9/1999 | Ekman | H04W 64/00 455/456.1 |
| 6,018,312 A | * | 1/2000 | Haworth | G01S 1/026 342/353 |

(Continued)

FOREIGN PATENT DOCUMENTS

EP        2900022      7/2015

OTHER PUBLICATIONS

PCT Notification of Transmittal of the International Search Report and the Written Opinion of the International Searching Authority, or the Declaration for International application No. PCT/EP2015/072877 dated Feb. 8, 2016.
(Continued)

*Primary Examiner* — Emmanuel Bayard
(74) *Attorney, Agent, or Firm* — Baker Botts, LLP

(57) ABSTRACT

A User Equipment comprises a master clock, for example a Precision Time Protocol, PTP, or Precision Time Control Protocol, PTCP, network clock. The User Equipment further comprises circuitry configured to set the master clock based on signals from a wireless communications network node and a time offset, wherein the time offset is based on the propagation delay between the wireless network node and the User Equipment. The circuitry is further configured to send timing information to a network device in a communications network having a slave clock, whereby the network device can synchronize its slave clock with respect to the master clock comprised within the User Equipment.

17 Claims, 12 Drawing Sheets

(51) Int. Cl.
*H04W 84/20* (2009.01)
*H04J 3/06* (2006.01)

(58) Field of Classification Search
USPC ................................. 375/219–222, 354–358
See application file for complete search history.

(56) References Cited

U.S. PATENT DOCUMENTS

| | | | |
|---|---|---|---|
| 9,112,630 B1* | 8/2015 | Mizrahi | H04J 3/0641 |
| 9,137,767 B1* | 9/2015 | Guthrie | H04W 40/02 |
| 2009/0016321 A1 | 1/2009 | Li et al. | |
| 2009/0079633 A1* | 3/2009 | Ward | G01S 5/021 |
| | | | 342/387 |
| 2013/0229982 A1 | 9/2013 | Ma | |
| 2014/0140456 A1* | 5/2014 | Tavildar | H04J 3/0641 |
| | | | 375/354 |
| 2015/0131991 A1* | 5/2015 | Hattori | H04J 14/0212 |
| | | | 398/47 |
| 2017/0034797 A1* | 2/2017 | Parulkar | H04W 56/001 |
| 2017/0168163 A1* | 6/2017 | Small | G01S 19/10 |

OTHER PUBLICATIONS

ETSI TS 136 300 v8.1.0; Technical Specification; Universal Mobile Telecommunications System (UMTS); Evolved Universal terrestrial Radio Access (E-UTRA) and Evolved Universal Terrestrial Radio Access (E-UTRAN); Overall description; Stage 2 (3GPP TS 36.300 version 8.1.0 Release 8), Jun. 2007.

IEEE Standard for a Precision Clock Synchronization Protocol for Networked Measurement and Control Systems; IEEE Instrumentation and Measurement Society; Sponsored by the Technical Committee on Sensor Technology (TC-9), Jul. 24, 2008.

3GPP TS 36.413 v10.1.0; Technical Specification; 3rd Generation Partnership Project; Technical Specification Group Radio Access Network; Evolved Universal Terrestrial Radio Access Network (E-UTRAN); S1 Application Protocol (S1AP) (Release 10), Mar. 2011.

ITU-T; G.8275.1/Y.1369.1; Telecommunication Standardization Sector of ITU; Series G: Transmission Systems and Media, Digital Systems and Networks, Jul. 2014.

* cited by examiner

Fig. 2

| Names for PROFINET | Names for PTP |
|---|---|
| SyncPDU | Sync |
| FollowUpPDU | Follow_Up |
| AnnouncePDU | Announce |
| Not used | Delay_Req |
| Not used | Delay_Resp |
| DelayReqPDU | Pdelay_Req |
| DelayReqPDU | Pdelay_Resp |
| DelayResPDU | Pdelay_Resp_Follow_Up |
| Not used | Signaling |
| Not used | Management |

SYNCHRONIZING CLOCKS IN A COMMUNICATIONS NETWORK

PRIORITY

This nonprovisional application is a U.S. National Stage Filing under 35 U.S.C. § 371 of International Patent Application Serial No. PCT/EP2015/072877, filed Oct. 2, 2015, and entitled "Synchronizing Clocks in a Communications Network."

TECHNICAL FIELD

The present invention relates to a method and apparatus for synchronizing clocks in a communications network such as, but not exclusively, an Industrial Automation network.

BACKGROUND

Industrial Automation networks provide specialized control systems for industry equipment, and thus enable the automation of various industrial processes. For example, such industrial processes may include plant measurement control or precise motion control in a robotized factory assembly line. As illustrated in FIG. 1, Industrial Automation networks 10 may comprise a plurality of slave devices 12, for example actuators or sensors, which are connected to a control device 14. In this example, each of the slave devices 12 is configured to transmit data to and receive data from the control device 14.

Various applications for Industrial Automation exist, which have different requirements in terms of latency and time synchronization between the network devices 12, 14. For the most time critical applications, isochronous real time communication between the slave devices 12 and the control device 14 is typically required. This demands very precise synchronization between the network clocks (not shown) at the respective network devices 12, 14, for example synchronization within one to a few microseconds.

There are a number of network protocols for Industrial Automation networks, one of which is the PROFINET IO protocol defined in IEC61784-2. PROFINET IO is based on Ethernet, and has the advantage that it offers a flexible communication model, which can carry both real-time and non-real time traffic. For the most time critical applications, which require isochronous real-time communication, PROFINET IO has defined the RT_Class_3. This class defines a communication cycle and, for each network device 12, 14, specifies a precise time slot in the communication cycle in which that network device 12, 14 may transmit data.

In order to synchronize the network clocks at the network devices 12, 14, to the necessary degree, PROFINET IO includes a Precision Time Control Protocol (PTCP). This protocol operates in the same manner as the Precision Time Protocol (PTP) standardized in IEEE 1588, based on the exchange of two-way time synchronization messages between pairs of network devices. However, the time synchronization messages in PTCP are encoded differently from those in PTP. FIG. 2 shows the mapping of PTCP and PTP messages.

By way of example, FIG. 3 is a signal diagram showing the transmission of PTP synchronization messages between a pair of network nodes (which may be referred to as network devices). In this example, a first network node (not shown) on the left of the page has a network clock acting as a "master" clock representing "master time". A second network node 16 on the right of the page is synchronizing its network clock (which will be referred to as a "slave" clock) with respect to the master clock at the first network node.

At 300, the first network node transmits a first synchronization message to the second network node. The first network node includes in the first synchronization message, or in a follow up message, a first time stamp, t1, generated by its "master" clock, indicating the time of transmission of the first synchronization message. The second network node, at 310, receives the first time synchronization message and stores, together with the first time stamp, t1, a second time stamp, t2, generated by its "slave" clock indicating the time of receipt of the first time synchronization message (from the perspective of its slave clock). At 320, the second network node transmits a second time synchronization message to the first network node. The second network node stores a third time stamp, t3, generated by its slave clock indicating the time of transmission of the second time synchronization message. At 330, the first network node receives the second time synchronization message, and transmits a fourth time stamp, t4, generated by its master clock to the second network node, indicating the time of receipt of the second time synchronization message at the first network node.

Thus, the second network node 16 has four time stamps: two, t1 and t4 generated by the first network node by its "master clock", and two, t2, t3, generated by the second network node by its "slave clock". Thus, by assuming that the time of transmission of the first synchronization message (in the direction from the first network node to the second network node) is the same as the time of transmission of the second time synchronization message (in the direction from the second network node to the first network node), the second network node can calculate a time offset of its slave clock with respect to the master clock using the four time stamps: t1, t2, t3, t4. Thus, the second network node can adjust its network clock by the calculated time offset, so as to synchronize its network clock to the network clock of the first network node.

At present, Industrial Automation Networks are implemented using wired networks. For example, a typical topology of a PROFINET IO network is shown in FIG. 4. The network 10 comprises a plurality of IO (Input Output) devices 12, 14, coupled by wired connections 18 for example Ethernet cables.

However, the Applicant has appreciated that it may be advantageous to upgrade or implement Industrial Automation networks 10 such that the network devices 12, 14 can communicate over a wireless communications network.

Two possible wireless deployments are illustrated in FIG. 5. As shown in FIG. 5a, the IO (Input Output) devices 12, 14 could be configured to communicate via an operator controlled wireless communications network 20. Alternatively, as shown in FIG. 5b a dedicated wireless communications network 20 may be provided at the Industrial Automation site. In this case, a radio access network including a base station 22 and one or more core network nodes 24 may be located at the Industrial Automation site.

A cellular layout has the advantage that it may provide a flexible deployment, require less material handling, work-in-process inventory, and offer a reduced setup time in comparison to a wired network.

However, the use of a wireless communications network is not currently feasible, at least for the most time critical Industrial Automation applications. The 5G radio interface and related core network functions currently under development may be able to provide low enough latency to satisfy time critical Industrial Automation applications. However, the Applicant has appreciated that, in addition to low latency, the most time critical Industrial Automation applications require precise time synchronization between network devices, for example within one microsecond.

If PTP or PTCP synchronization messages are exchanged by network devices over a wireless communications network it is not currently possible to achieve sufficiently precise synchronization between the clocks at the network devices. This is because the frame structure of the radio interface, processing and buffering of transmissions by the User Equipments associated with the network devices, and scheduling at the base station, causes uncontrolled and varying asymmetries between the times of transmission of the synchronization messages. Thus, it cannot be assumed, as required by the PTP and PTCP time synchronization protocols, that the times of transmission of the time synchronization messages, in opposite directions, are the same.

SUMMARY

Thus, the Applicant has appreciated that it would be desirable to provide an improved way of achieving time synchronization between network devices having respective clocks in a communications network.

According to the present invention, there is provided a method, in a User Equipment. The method comprises receiving reference signals from a wireless communications network node, obtaining a time offset, wherein the time offset is based on the propagation delay of the reference signals, and setting a master clock comprised within the User Equipment based on the reference signals and the time offset. The method further comprises sending timing information to a network device having a slave clock in a communications network using the master clock.

Thus, the network device can synchronize its slave clock with respect to the master clock comprised within the User Equipment.

Advantageously, since the master clock comprised within the User Equipment is set based on the received reference signals, and the obtained time offset which is based on the propagation delay of the reference signals, the master clock can be set to a "common" network time, i.e. master clocks comprised within respective User Equipments (at different locations) may be set to the same network time. Thus, advantageously, slave clocks at respective network devices in a communications network, which are synchronized with respect to master clocks in respective User Equipments, can be synchronized with each other; i.e. set to the same "network time" (within an error margin).

Thus, advantageously, embodiments of the present invention enable more accurate synchronization of clocks at respective network devices in a communications network, even if the network devices are arranged to communicate over a wireless communications network, i.e. wirelessly. Moreover, embodiments of the present invention have the advantage that they do not require modifications to the network devices, which may for example facilitate upgrade of existing "wired" communications networks for communication over a wireless communications network In preferred embodiments, the master clock may be a Precision Time Protocol, PTP, network clock, as specified in IEEE 1588, or a Precision Time Control Protocol, PTCP, network clock, as specified in IEC 61784-2.

The timing information may comprise one or more time stamps generated by the master clock.

In preferred embodiments, the timing information may be sent to the network device according to a time synchronization protocol, for example a time synchronization protocol based on two-way exchange of time synchronization messages.

In a preferred embodiment, the time synchronization protocol may be a time synchronization protocol specified in IEEE 1588.

According to embodiments of the present invention the reference signals may comprise at least one of: Primary Synchronization Signals, PSS; Secondary Synchronization Signals; Positioning Reference Signals, PRS, and Common Reference Signals, CRS. As will be understood by those skilled in the art, it is known for a User Equipment to use these types of signal to "synchronize" to a serving wireless network node, such that the User Equipment can communicate with the wireless network node. This can be achieved since these signals have a predetermined repeating pattern. However, it should be appreciated that, since this "synchronization" does not take into account the propagation delay of the reference signals, the "network time", from the perspective of different User Equipments, at different locations, will be different.

The technique of setting a network clock with respect to a network clock in a wireless communications network node, based on wireless reference signals received from the wireless communications network node and an obtained time offset, based on the propagation delay of the reference signals, may be referred to as Network Listening, NL or Radio Interface Based Synchronisation, RIBS. This is known technique by which a wireless communications network node (e.g. a HeNB) may synchronize its network clock with respect to the network clock at another wireless communications network node (e.g. a eNB). This technique, in relation to wireless communication network node to wireless communication network node synchronization, is described in technical reports 3GPP TS 36.413 and TS 32.592. This technique may be used by a wireless communications network node for example if there is no wired backhaul network connecting the wireless communications network nodes, which may be used to convey Precision Time Protocol, PTP, synchronization messages, or if the wireless communications network node does not have a GNSS (Global Navigation Satellite System) receiver. This may be for example because the wireless communications network node is located indoors such that a GNSS signal, for example a GPS (Global Positioning Signal), may not be received reliably. The purpose of synchronizing network clocks at respective wireless communications network nodes to a "common" network time, in contrast to the present invention, is to enable the wireless communications network nodes to coordinate for example scheduling of User Equipment transmissions, in order to reduce interference in the network.

According to preferred embodiments of the present invention, obtaining the time offset may comprise determining the time offset from at least one of: location information of the User Equipment and a Timing Advance value, specified in 3GPP TS 36.133.

As will be understood by those skilled in the art, a Timing Advance value may be transmitted by a wireless communications network node to each of the User Equipments in its coverage area. These values indicate a delay which the respective User Equipments should apply before transmitting an uplink transmission (to the wireless communications network node). The aim is to ensure that the uplink transmissions arrive at the wireless communications network node at a predetermined time (from the perspective of the wireless communications network node), regardless of the locations of the User Equipments. That is, a first User Equipment closer to the wireless communications network node than a second User Equipment will be assigned a Timing Advance value longer than the Timing Advance value assigned to the second User Equipment. Thus, a Timing Advance value takes into account the propagation delay between the wireless communications network node and a User Equipment. Thus the Applicant has appreciated that, advantageously, a time offset according to the present invention may be derived from a Timing Advance value.

However, other ways of obtaining the time offset are possible, as will be explained further below.

According to a preferred embodiment of the present invention, setting the master clock may comprise setting a first time part comprised within the User Equipment based on the reference signals, and applying the time offset to the first time part. The first time part may thus provide a synchronization signal to the master clock. This synchronization signal may be an electrical signal comprising one or more synchronization pulses. This may provide a simple, cost effective and reliable implementation.

According to an embodiment, the first time part may maintain time using time units specified by a radio access technology, and the master clock may maintain time using different time units from the first time part. According to an embodiment, the method may further comprise providing an absolute time reference associated with the synchronization signal to the master clock.

According to the present invention, there is also provided a User Equipment comprising a master clock. The User Equipment further comprises a receiving unit for receiving reference signals from a wireless communications network node, and obtaining unit for obtaining a time offset, wherein the time offset is based on the propagation delay of the reference signals. The User Equipment also comprises a setting unit for setting the master clock based on the reference signals and the time offset. The User Equipment further comprises a sending unit for sending timing information to a network device having a slave clock in a communications network using the master clock.

According to the present invention, there is further provided a system comprising a User Equipment as described above and a network device having a slave clock. The network device comprises a receiving unit for receiving the timing information from the User Equipment. The network device further comprises a synchronizing unit for synchronizing its slave clock with respect to the master clock comprised within the User Equipment based on the timing information.

According to a preferred embodiment, the network device may be coupled to the User Equipment by a wired connection.

According to a preferred embodiment of the present invention, the network device may be an Industrial Automation device, and may for example be configured according to a PROFINET IO protocol specified in IEC61784-2.

There is further provided a communications network comprising a first network device having a first slave clock, a second network device having a second slave clock, a first User Equipment as described above, and a second User Equipment as described above. The first network device comprises a receiving unit for receiving the timing information from the first User Equipment and a synchronizing unit for synchronizing its slave clock with respect to the master clock comprised within the first User Equipment based on the timing information received from the first User Equipment. The second network device has a receiving unit for receiving the timing information from the second User Equipment and a synchronizing unit for synchronizing its slave clock with respect to the master clock comprised within the second User Equipment based on the timing information received from the second User Equipment.

Thus, advantageously, the first slave clock, at the first network device, may be synchronized with respect to the second slave clock, at the second network device, without for example sending time synchronization messages between the first network device and second network device.

In preferred embodiments, the first network device is configured to communicate with the second network device over a wireless communications network; i.e. wirelessly. For example, the first network device may be configured to send a communication via the first User Equipment, or via another User Equipment, to the second network device.

There is further provided a computer program configured to, when run on a processor, cause the processor to perform the method according to an embodiment of the present invention. The computer program may be provided on a carrier which may be, for example, an electronic signal, an optical signal, a radio signal or a computer readable storage medium.

There is further provided a User Equipment comprising a master clock and circuitry. The circuitry is configured such that the User Equipment is operable to: receive reference signals from a wireless communications network node, obtain a time offset, wherein the time offset is based on the propagation delay of the reference signals, set the master clock based on the reference signals and the time offset, and send timing information to a network device having a slave clock in a communications network using the master clock.

BRIEF DESCRIPTION OF THE DRAWINGS

Preferred embodiments of the present invention will now be described, by way of example only, with reference to the accompanying drawings in which:

FIG. 2 illustrates the mapping between PTP and PTCP messages;

DETAILED DESCRIPTION

Figure 1:
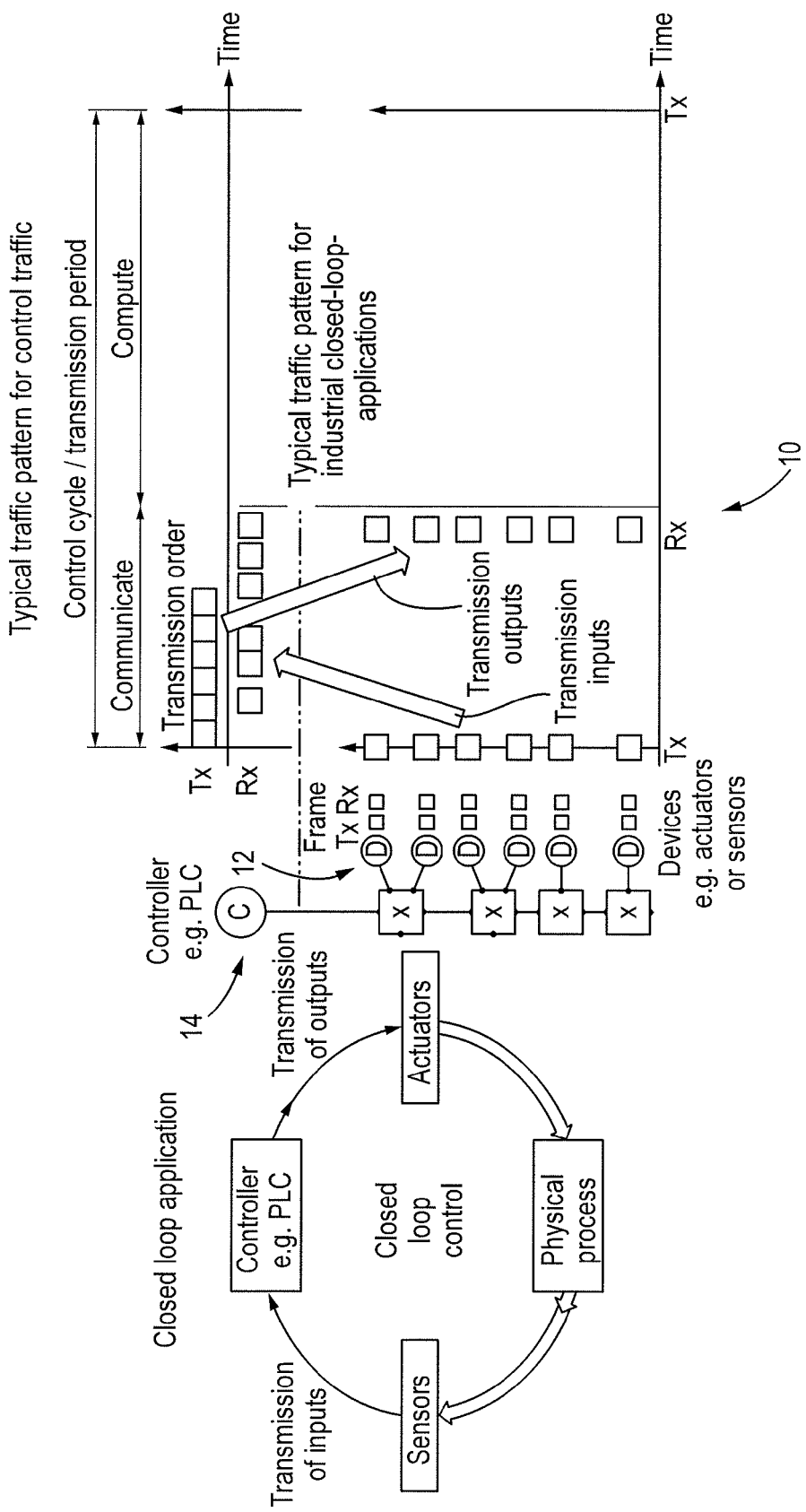
FIG. 1 illustrates a traffic pattern in an example Industrial Automation Network.
Figure 3:
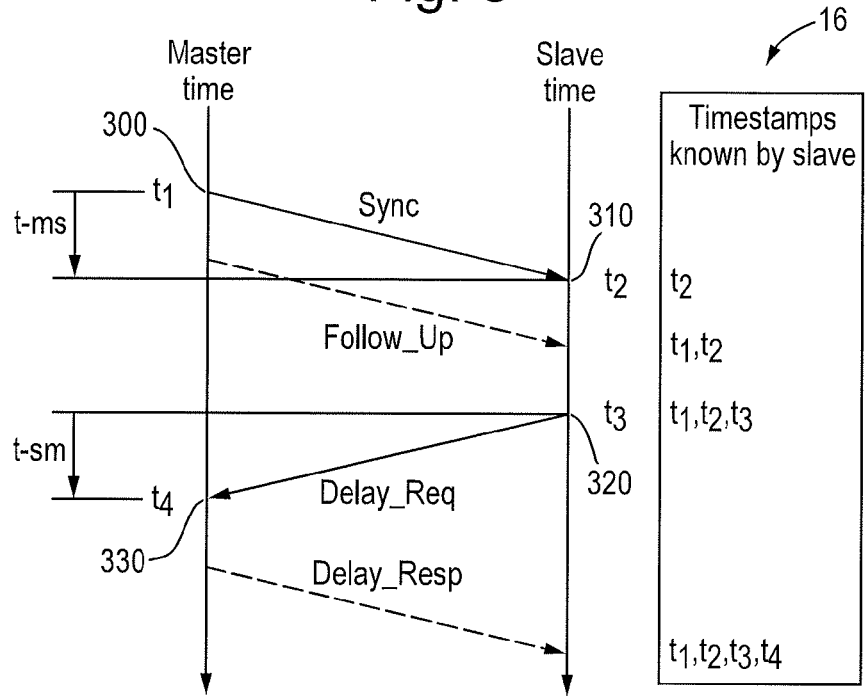
FIG. 3 illustrates an example of PTP signaling.
Figure 4:
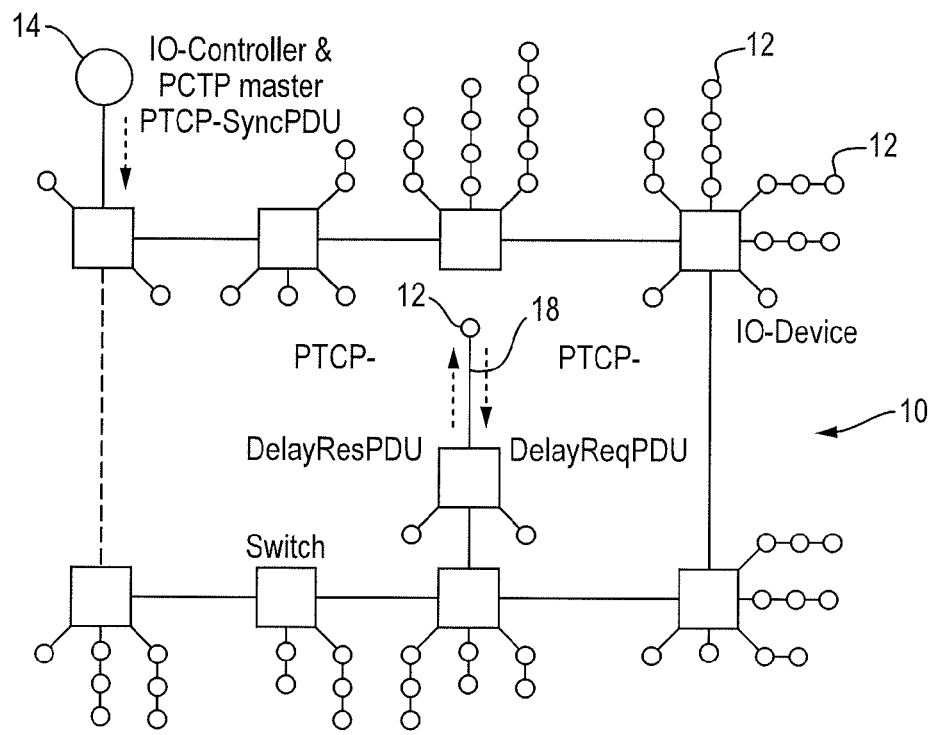
FIG. 4 shows an example topology of a wired PROFINET IO communications network.
Figure 5A:
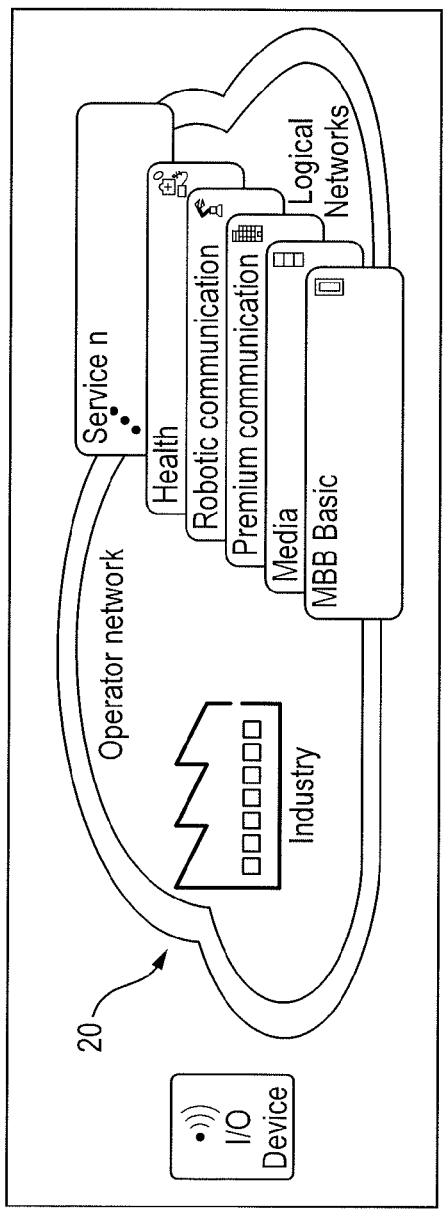
FIG. 5 illustrates two example wireless network deployment options for Industrial Automation networks.
Figure 5B:
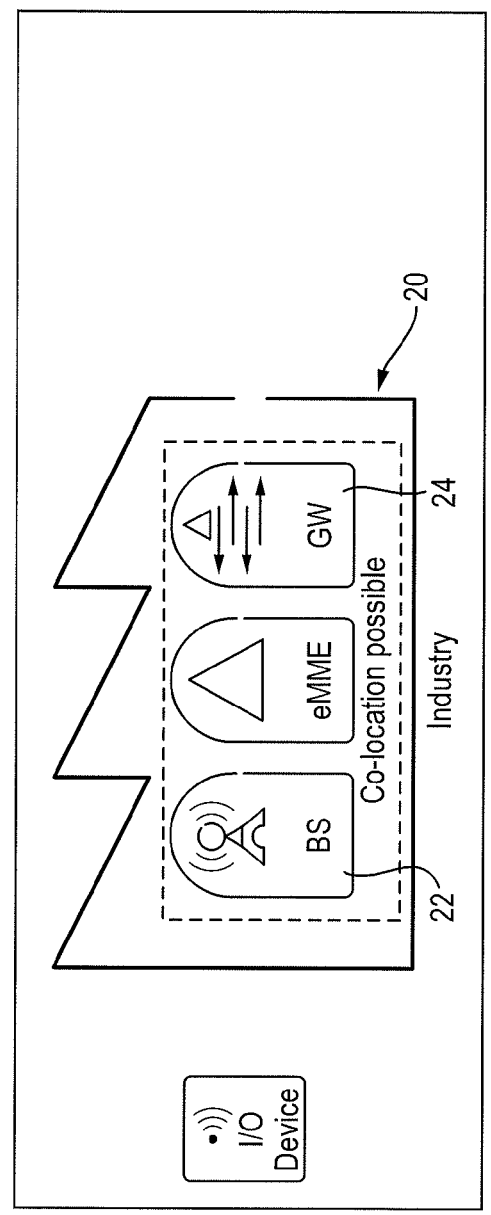
Figure 6:
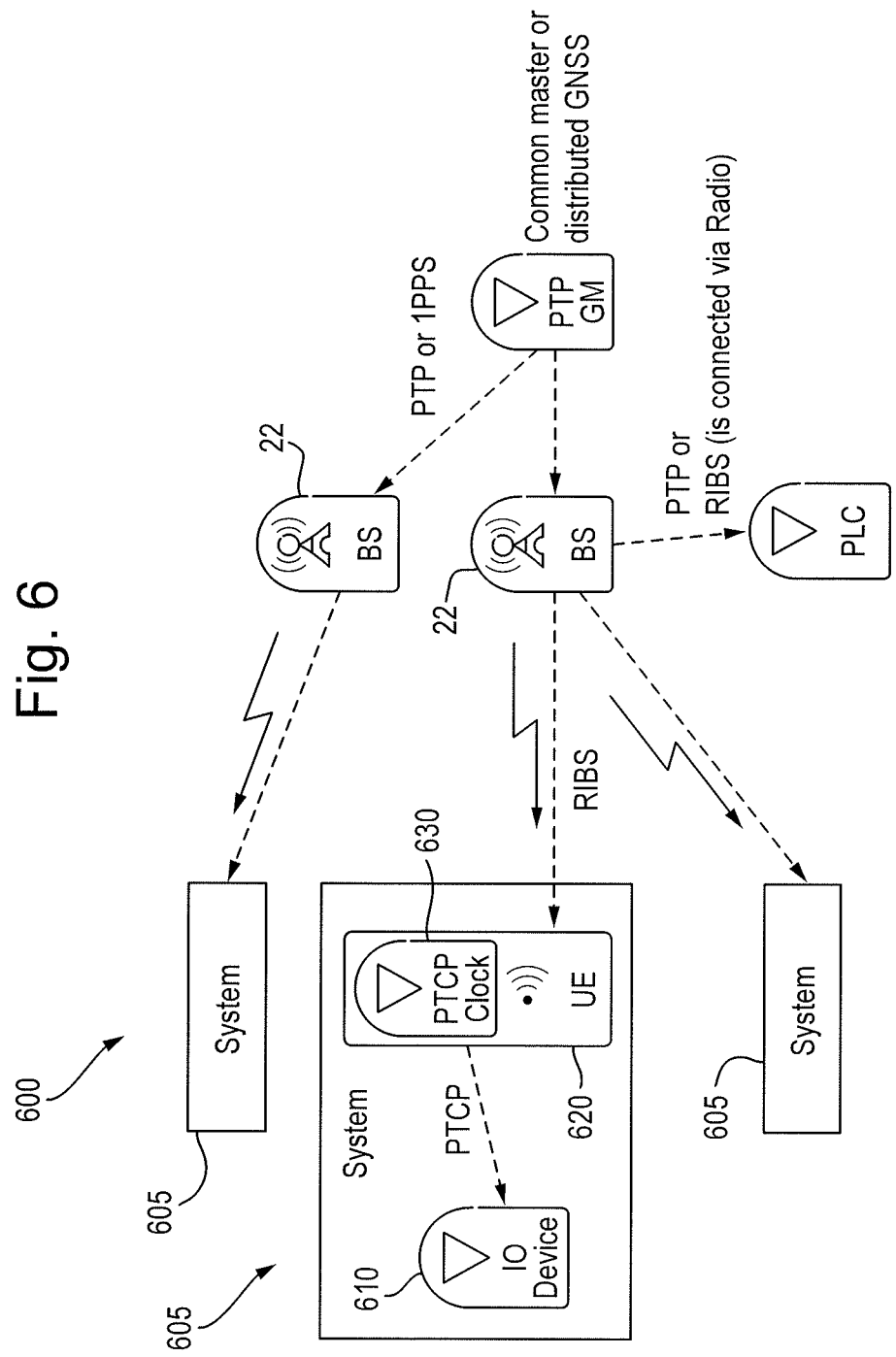
FIG. 6 shows an example of a communications network according to an embodiment of the present invention.

FIG. 6 shows an example of a communications network 600 according to an embodiment of the present invention. The communications network 600 comprises a plurality of network devices 610 each having a clock (not shown), which will be referred to as a slave clock. In this example, each of the network devices 610 is connected to the network via wireless links. In this example, the communications network 600 is an Industrial Automation network, and the network devices 610 are configured to automate industrial processes. Each of the network devices 610 may for example be configured according to the PROFINET IO protocol. However, other embodiments are possible.

As mentioned above, there are various use cases for Industrial Automation networks, such as but not exclusively: cell automation (for example automation of devices in an assembly line and robotized manufacture); automated guided vehicles; process automation (for example using distributed sensors and actuators to automate the operation of large scale industrial systems); and logistics tracking.

As explained above, in such communications networks 600 the clocks at the network devices 610 need to be synchronized to a "common" network time, and in particular, for the most time critical applications, within a high level of accuracy.

Although only shown in respect of one of the network devices 610 in FIG. 6, in this embodiment each of the network devices 610 is coupled to a respective User Equipment 620 which comprises a respective master clock 630. In this example, the master clocks 630 are Precision Time Control Protocol, PTCP, network clocks, as defined in IEC61784-2. However, again other embodiments are possible.

The User Equipments 620 may be referred to as a "UEs", or for example as a wireless communications network terminals. A "UE" is capable of communicating with a wireless communications network, in particular one or more wireless communications network nodes 22. The wireless communications network may apply any type of radio access technology, such as but not limited to LTE, LTE Advanced, WCDMA or any other 3GPP or other radio access technology. The one or more wireless communications network nodes 22 may be base stations, such as for example eNodeBs.

Figure 7A:
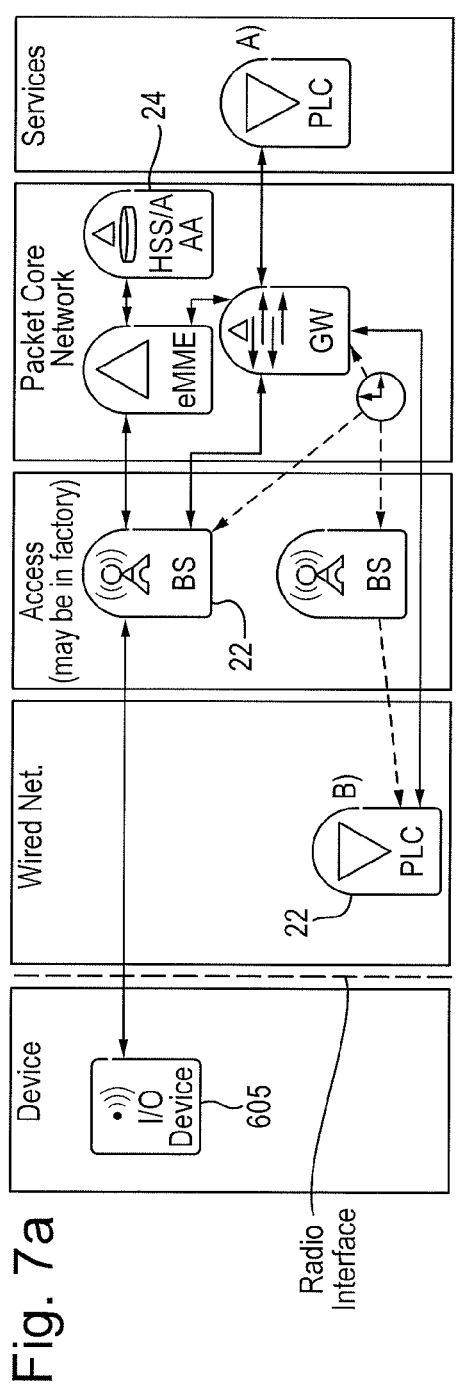
FIG. 7 shows example wireless communications network deployments.
Figure 7B:
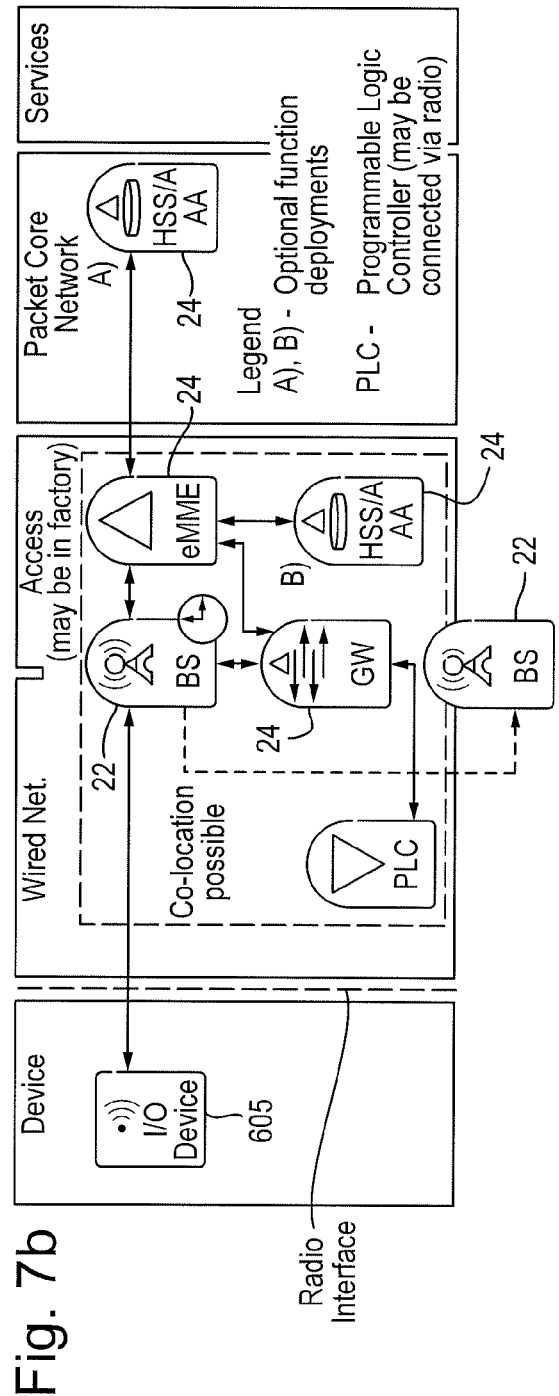

FIGS. 7a and 7b show example arrangements of the wireless communications network. For example, as shown in FIG. 7a, the wireless communications network may be an Operator controlled wireless communications network. In this example, the radio access part of the network (comprising for example one or more base stations 22) may be located at the site of the communications network 600 (for example, in a factory). These base stations 22 are connected to remote packet core network nodes 24. In this example, these packet core network nodes 24 comprise an MME (Mobility Management Entity), a gateway node (GW) and a Home subscriber node (HSS). The gateway node GW is connected to a PLC (Programmable Logic Controller). Alternatively, as shown in FIG. 7b the wireless communications network may be deployed locally. In this case, several of the packet core network nodes 24 (e.g. the MME, GW) may be co-located with the access network at the site of the communications network 600 (for example in a factory).

Figure 8:
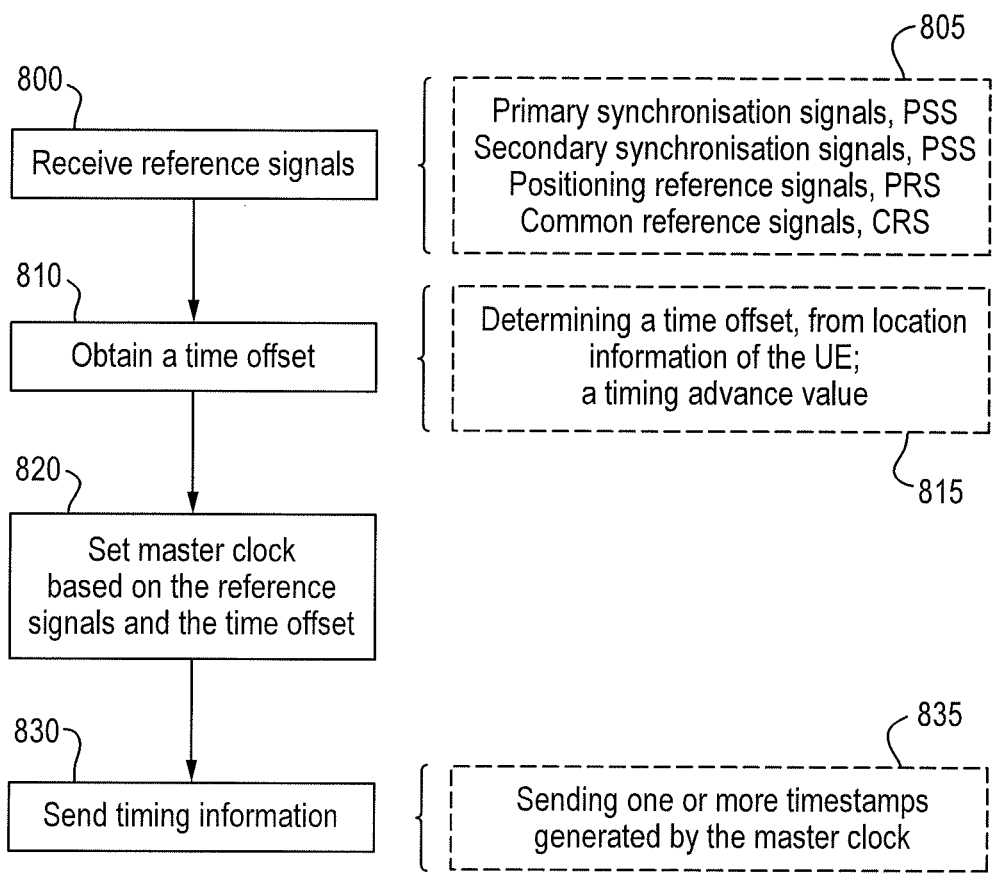
FIG. 8 is a flow chart illustrating an embodiment of the present invention.

FIG. 8 is a flow chart illustrating a method, in a User Equipment 620, according to an embodiment of the present invention. It should be appreciated that at least some of the steps may be performed in a different order or simultaneously. The method comprises, at 800, receiving reference signals from a wireless communications network node 22. As indicated at 805, the reference signals may for example comprise at least one of: Primary Synchronization Signals, PSS; Secondary Synchronization Signals; Positioning Reference Signals, PRS, and Common Reference Signals, CRS, defined for example in 3GPP standards. The method further comprises at 810 obtaining a time offset, wherein the time offset is based on the propagation delay of the reference signals. The term "propagation delay" refers to the time it takes the reference signals to travel from the wireless communications network node 22 to the User Equipment 620. It should be appreciated that the time offset may be obtained by the User Equipment 620 in a number of ways. For example, as indicated at 815, obtaining the time offset may comprise determining the time offset from location information of the User Equipment 620, or from a Timing Advance value, specified in 3GPP TS 36.133. The location information (and similarly the Timing Advance value) may for example be received by the User Equipment 620, from the (or another) wireless communications network node 22. Alternatively, the User Equipment 620 may simply receive the time offset from the (or another) wireless communications network node 22.

The method further comprises, at 820, setting a master clock 630 comprised within the User Equipment 620 based on the reference signals and the time offset. The method further comprises, at 830, sending timing information to a network device 610 having a slave clock in a communications network 600 using the master clock 630.

Thus, advantageously, the network device 610 can synchronize its slave clock with respect to the master clock 630 comprised within the User Equipment 620. Furthermore, by virtue of the "time offset", if each of the slave clocks at the network devices 610 in the communications network 600 is set with respect to a master clock in a respective User Equipment 620, in this way, advantageously, these slave clocks may be synchronized with respect to each other i.e. the slave clocks may be set to a common network time (within an error margin).

In this example, there are three network devices 610 in the communications network 600. However, it should be appreciated that there may be many more network devices 610. In this example, a first wireless communications network node 22 sends reference signals to two of the User Equipments 620, and a second wireless communications network node 22 sends reference signals to the other User Equipment 620. The master clocks 630 in the respective User Equipments 620, and therefore the network devices 610, may still however be set to the same network time; i.e. a common network time, for example if the wireless network clocks at the wireless communications network nodes 22 are synchronized. The network clocks at the wireless communications network nodes 22 may be synchronized with respect to each other by Precision Time Protocol, PTP, synchronization messages transmitted over a wired backhaul network, as indicated in FIG. 6, or for example by RIBS as explained above.

It should be appreciated that obtaining a time offset which is "based on the propagation delay of the reference signals" (i.e. which takes the propagation delay of the reference signals into account) advantageously enables the master clocks 630 in respective User Equipments 620 to be set to a common network time, as described above. However, it should also be appreciated that it is not necessary that the "common network time" is the same as the network time represented by the network clock at the wireless communications network node 22. For example, the obtained time offset may be such that the common network time may be offset with respect to the network clock at the wireless communications network node 22 by a predetermined amount.

As mentioned above, in the embodiment illustrated in FIG. 6 the master clocks 630 are Precision Time Control Protocol (PTCP) network clocks, defined in IEC61784-2. However, it should be appreciated that the master clocks 630 may be a different type of clock, for example depending on the configuration of the communications network 600. For example, the master clocks 630 may be Precision Time Protocol, PTP, network clocks, as defined in IEEE 1588, or another type of suitable network clock.

As indicated at 835 sending the timing information may comprise sending one or more timestamps generated by the master clock to the network device 610.

In particular, sending the timing information may advantageously comprise sending the timing information according to a time synchronization protocol adapted for use over a "wired" network. For example, the time synchronization protocol may be based on two-way exchange of time synchronization of synchronization messages. For example, the time synchronization protocol may be the Precision Time Control Protocol, PTCP, defined in IEC61784-2 or the Precision Time Protocol, PTP defined in IEEE 1588.

Figure 9:
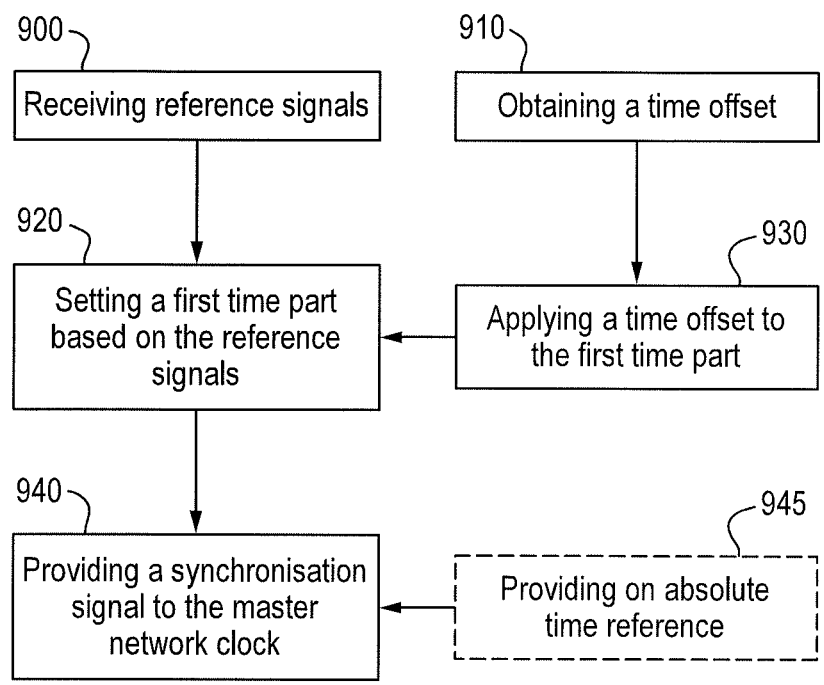
FIG. 9 is a flow chart illustrating a preferred embodiment of the present invention.

FIG. 9 is flow chart showing a method, in a User Equipment 620, according to a preferred embodiment of the present invention, for setting the master clock 630. It should be appreciated that other implementations are possible. Again, at least some of the steps may be performed in a different order or simultaneously.

The method comprises, at 900, receiving reference signals from a wireless communications network node 22. The method further comprises at 910 obtaining a time offset, wherein the time offset is based on the propagation delay of the reference signals. The method further comprises, at 920, setting a first time part comprised within the User Equipment 620 based on the reference signals, and at 930 applying the time offset to the first time part. The first time part may for example comprise an oscillator. At 940, the first time part provides a synchronization signal to the master clock 630. This synchronization signal may be an electrical signal comprising one or more synchronization pulses. For example, the synchronization signal may be a 1PPS (1 pulse per second signal).

This may provide a simple, cost effective and reliable implementation. For example, the pulse synchronization signal may simply be generated by one or more comparators associated with an external pin.

According to an embodiment, the first time part may maintain time using time units specified by a radio access technology, for example in relation to LTE, in periods of a 30.72 MHz clock. The master clock 630 may maintain time using different time units from the first time part. For example the master clock 630 may maintain UTC (Coordinated Universal Time). However, other embodiments are possible.

As shown at 945, optionally, the method may further comprise providing an absolute time reference associated with the synchronization signal to the master clock 630. This absolute time reference may for example comprise time of day information, which may be determined by the User Equipment 620 using for example the LTE positioning protocol (LPP) as defined in TS36.171 or any other suitable protocol.

The inventors have determined that it may be possible to achieve wireless network synchronization using RIBS at a User Equipment 620, in a controlled environment for example with limited interference, with an accuracy of +/−500 ns. This error margin may be less in for example indoor Industrial Automation applications where there is low latency and good SNR (Signal to Noise Ratio). This may allow for an error, for example some few hundreds ns of error, in the first time part propagation delay calculation/master clock combination, and yet synchronization within an acceptable margin, even for time critical applications, to be achieved.

In embodiments where the first time part comprises an oscillator, such error may predominately be caused by the oscillator in the first time part. Thus the error may be reduced, if necessary, by using a more expensive oscillator, or by updating the first time part more frequently.

According to a preferred embodiment of the present invention, setting the master clock 630 may comprise setting the master clock 630, as described above, periodically.

Figure 10:
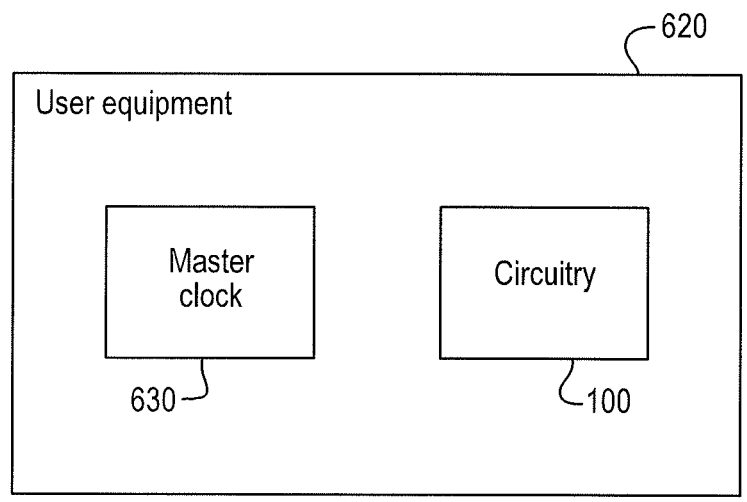
FIG. 10 shows a User Equipment according to an embodiment of the present invention.

FIG. 10 shows a User Equipment 620 according to an embodiment of the present invention.

The User Equipment 620 comprises a master clock 630 and circuitry 100 which is configured such that the User Equipment 620 is operable to perform any of the methods described above. The circuitry 100 may comprise a processing unit for example a microprocessor, digital signal processor (DSP), Field programmable gate array (FPGA), or Application Specific Integrated Circuit (ASIC), and or any other form of circuitry. The circuitry 100 may further comprise a memory, which may be volatile or non-volatile, which may comprise instructions, which may be carried out by the processing unit. The circuitry 100 may be integrated to any degree.

The circuitry 100 may be configured such that the User Equipment 620 is operable to receive reference signals from a wireless communications network node 22, obtain a time offset, wherein the time offset is based on the propagation delay of the reference signals, set the master clock 630 based on the reference signals and the time offset, and send timing information to a network device 610 having a slave clock in a communications network 600 using the master clock 630.

Figure 11:
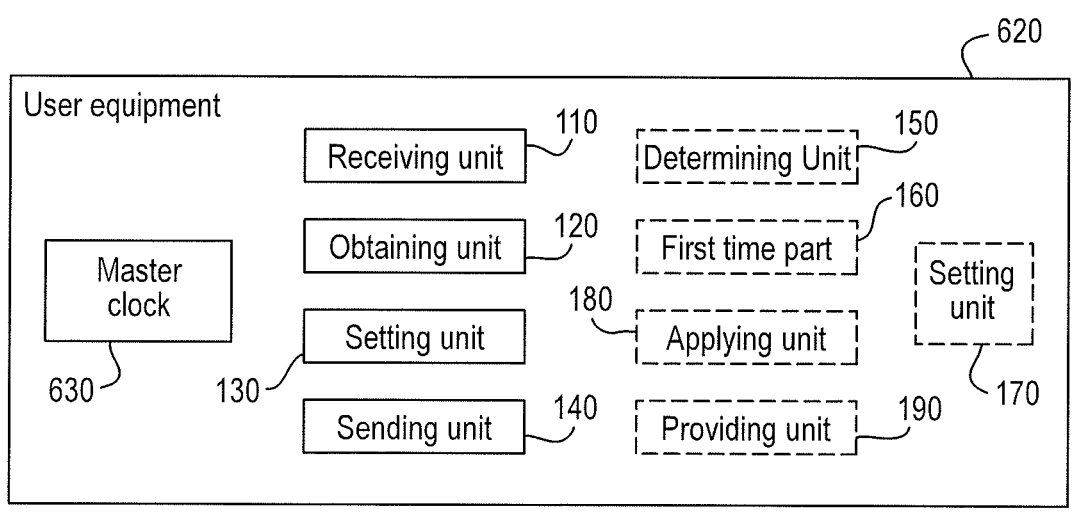
FIG. 11 shows a User Equipment according to an embodiment of the present invention.

FIG. 11 shows a User Equipment 620 according to another embodiment of the present invention. The User Equipment 620 comprises a master clock 630. The User Equipment 620 further comprises a receiving unit 110 for receiving reference signals from a wireless communications network node, and an obtaining unit 120 for obtaining a time offset, wherein the time offset is based on the propagation delay of the reference signals. The User Equipment 620 also comprises a setting unit 130 for setting the master clock 630 based on the reference signals and the time offset. The User Equipment 620 further comprises a sending unit 140 for sending timing information to a network device 610 having a slave clock in a communications network 600 using the master clock 630.

The master clock 630 may be at least one of: a Precision Time Protocol, PTP, network clock specified in IEEE 1588; and a Precision Time Control Protocol, PTCP, network clock specified in IEC 61784-2. However, as explained above, the master clock 112 may be any other type of network clock.

The master clock 630 may be configured to generate one or more time stamps, whereby the timing information may comprise one or more time stamps generated by the master clock 630.

The sending unit 140 may be for sending the timing information according to a time synchronization protocol, for example according to a time synchronization protocol specified in IEEE 1588 or IEC61784-2. The time synchronization protocol may require two way exchange of time synchronization messages, and therefore the User Equipment 620 may further comprise a receiving unit (not shown in FIG. 11) for receiving a time synchronization message from the network device 610.

The reference signals, as explained above, may comprise at least one of: Primary Synchronization Signals, PSS; Secondary Synchronization Signals, SSS; Positioning Reference Signals, PRS, and Common Reference Signals, CRS.

The User Equipment 620 may further comprise a determining unit 150 for determining the time offset, for example from at least one of location information of the User Equipment 620; and a Timing Advance value specified in TS 36.133. Alternatively, the User Equipment 620 may comprise a receiving unit for receiving the time offset, for example from a wireless communications network node.

Figure 12:
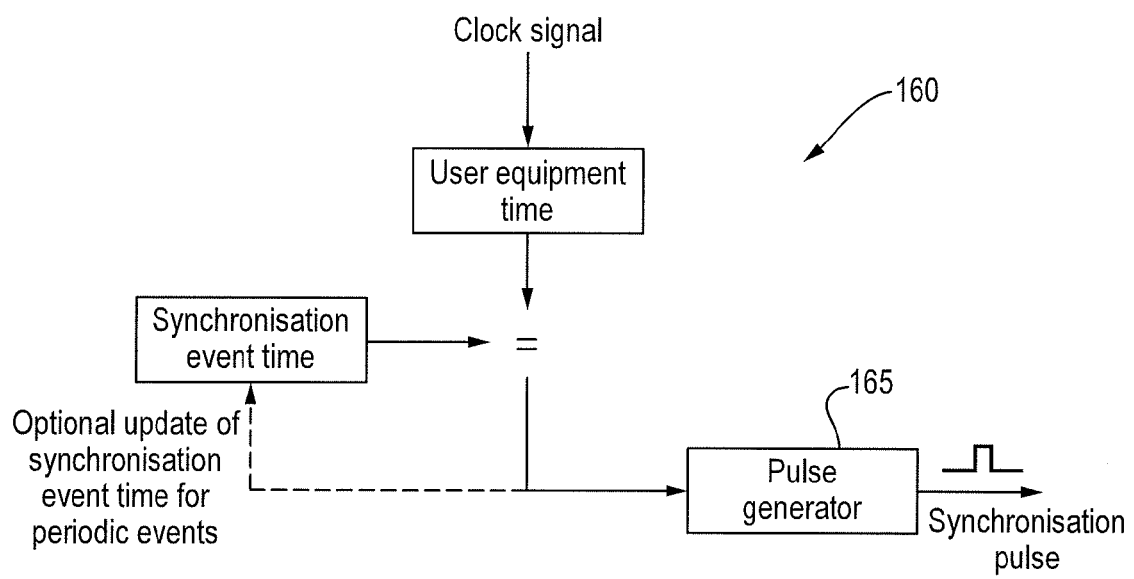
FIG. 12 illustrates a synchronization pulse generator according to a preferred embodiment of the present invention.

According to a preferred embodiment, the User Equipment 620 may further comprise a first time part 160, for example as described above. The first time part 160 may comprise an oscillator. The User Equipment 620 may further comprise a setting unit 170 for setting the first time part 160 comprised within the User Equipment 620 based on the reference signals. The User Equipment 620 may further comprise an applying unit 180 for applying the time offset to the first time part 160. The first time part 160 may be configured to provide a synchronization signal to the master clock 630. For example, the synchronization signal is an electrical signal comprising one or more synchronization pulses. An example of a first time part 160 according to this arrangement is illustrated in FIG. 12. FIG. 12 shows that the first time part 160 may comprise a pulse generator 165 for generating the synchronization signal. The pulse generator 165 may for example comprise one or more comparators associated with an external pin. The setting unit 130 may be configured to periodically update the master clock 630 as described in embodiments above. For example, the applying unit 180 may be configured to periodically apply a time offset to the first time part 160 (for example to take into account that the User Equipment 620 may have moved location), as illustrated in FIG. 12. The synchronization signal may be output, and provided to the master clock 630, continuously or intermittently.

In an embodiment, the first time part 160 may be configured to maintain time using time units specified by a radio access technology. The master clock 630 may be configured to maintain time using different time units from the first time part 160. The User Equipment 620 may further, optionally, comprise a providing unit 190 for providing an absolute time reference associated with the electrical signal comprising one or more synchronization pulses to the master clock 630.

Figure 13:
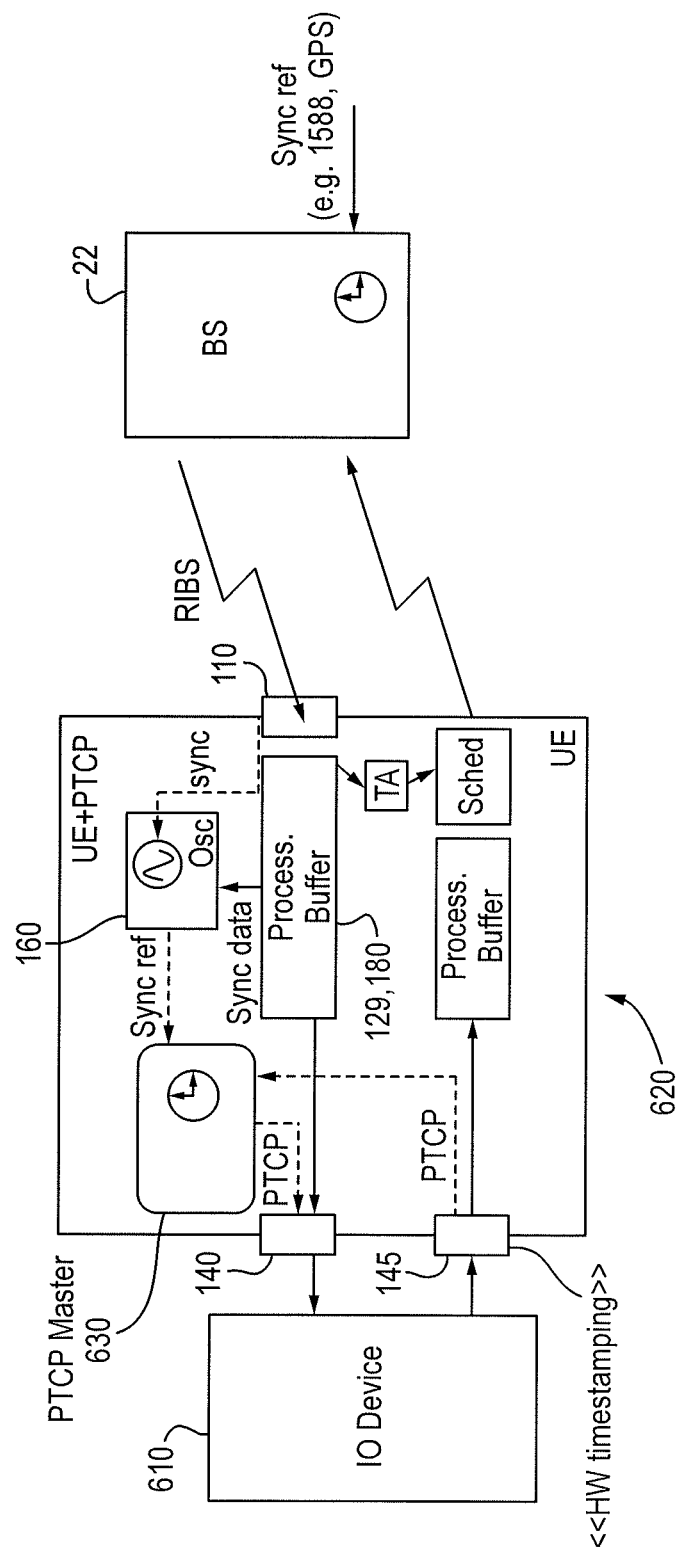
FIG. 13 shows the configuration of a User Equipment according to a preferred embodiment of the present invention.

FIG. 13 shows an example of a configuration of a User Equipment 620 according to a preferred embodiment of the present invention. FIG. 13 also shows a wireless network node 22 arranged to send the reference signals to the User Equipment 620, and a network device 610 arranged to receive the timing information from the User Equipment 620. In this example, the User Equipment 620 comprises a receiving unit 110 configured to receive reference signals from a wireless communications network node 22, and a first time part 160 comprising an oscillator which is configured to synchronize to the received reference signals, as will be understood by those skilled in the art. The User Equipment 620 further comprises an obtaining unit 120 and an applying unit 180 including a processor and a buffer. These units are configured to obtain a time offset based on the propagation delay of the reference signals, for example as described above, and apply a corresponding time offset to the first time part 160. The first time part 160 is further configured to provide a synchronization signal (which may also be referred to as a synchronization reference) to the master clock 630. In this example the master clock 630 is a PTCP network clock. There is further a sending unit 140, coupled to the master clock 630, which is configured to send timing information to the network device 610, whereby the network device 610 can synchronize its slave clock (in this example a PTCP network clock) with respect to the master clock 630. For example, this timing information may comprise one or more time stamps generated by the master clock 630. In this example, the timing information is transmitted according to the PTCP protocol, and the User Equipment 620 further comprises a receiving unit 145 configured to receive information from the network device 610, for example a time synchronization message, as indicated by a dashed line in FIG. 13 in accordance with the PTCP protocol. The User Equipment 620 may also be configured to receive communications (i.e. data) for transmission from the network device 610 to a further network device 610 over the wireless communications network, via the receiving unit 145. In this case, the User Equipment 620 is configured to process, buffer and schedule the data for transmission over the wireless communications network, including for example applying a Timing Advance value if appropriate, as will be understood by those skilled in the art.

Each of the receiving unit 110, obtaining unit 120, setting unit 130, sending unit 140, determining unit 150, first time part 160, setting unit 170 and applying unit 180 may be implemented in circuitry. The circuitry may comprise a processing unit for example a microprocessor, digital signal processor (DSP), Field programmable gate array (FPGA), or Application Specific Integrated Circuit (ASIC), and or any other form of circuitry. The circuitry 100 may further comprise a memory, which may be volatile or non-volatile, which may comprise instructions, which may be carried out by the processing unit. The circuitry may be integrated to any degree. The units 110 to 180 may be integrated to any degree.

The master clock 630 may also be implemented in circuitry, as will be understood by those skilled in the art.

Figure 14:
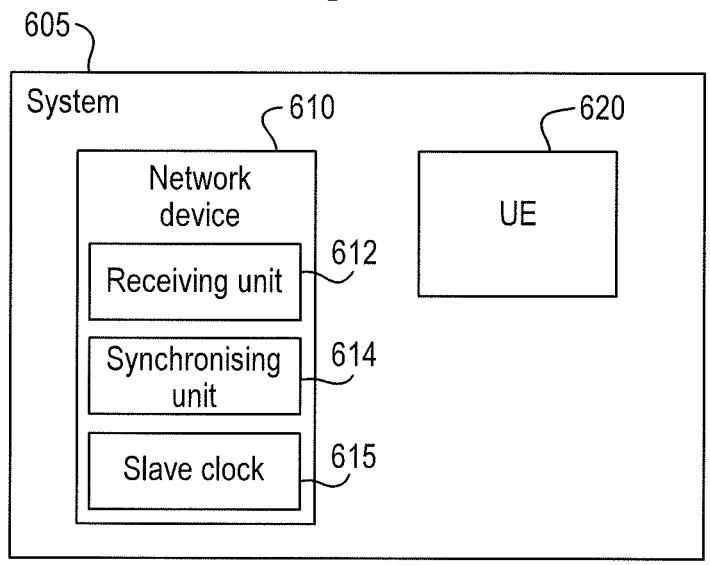
FIG. 14 illustrates a system comprising a User Equipment and a network device according to an embodiment of the present invention.

FIG. 14 shows a system 605 comprising a User Equipment 620 as described above and a network device 610 having a slave clock 615. The network device 610 comprises a receiving unit 612 for receiving the timing information from the User Equipment 620. The network device 610 further comprises a synchronizing unit 614 for synchronizing its slave clock 615 with respect to the master clock 630 comprised within the User Equipment 620 based on the timing information. In some embodiments, the network device 610 may further comprise a sending unit (not shown) for, for example, sending time synchronization messages to the User Equipment 620. This sending unit may also be for sending data, according to timing provided by the slave clock, for transmission over the wireless communications network, to another network device 610, as will be discussed further below.

According to a preferred embodiment of the present invention, the network device 610 may be an Industrial Automation device (i.e. part of an Industrial Automation network arranged to automate an industrial process, for example as described above). The network device 610 may for example be configured according to a PROFINET IO protocol specified in IEC61784-2. Although other embodiments are possible.

The network device 610 may be connected to the User Equipment 620, for example by a "wired" connection, such as by an electrical or optical cable. The network device 610 and the User Equipment 620 may be comprised within a single integrated apparatus. However, it should be appreciated that this not necessary in order to achieve sufficiently accurate synchronization of the slave clock 615 at the network device 610, and various arrangements of the system 605 are possible.

Again, each of the receiving unit 612 and the synchronization unit 614 may be implemented in circuitry, as defined above. The receiving unit 612 and the synchronization unit 614 may be integrated to any degree.

Figure 15:
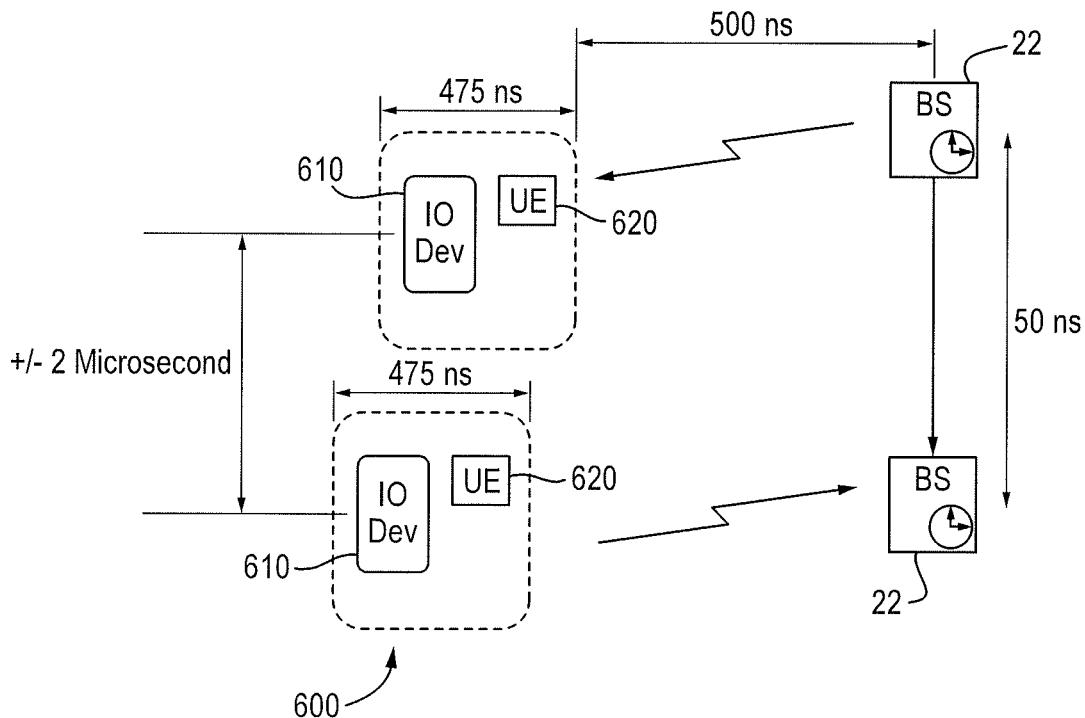
FIG. 15 illustrates a communication network according to an embodiment of the present invention.

FIG. 15 shows a communications network 600 comprising a first network device 610 having a first slave clock 615, and a second network device 610 having a second slave clock 615. However, as mentioned above the communications network 600 may comprise many more network devices 610, each associated with a respective User Equipment 620. In this example, the first network device 610 is associated with a first User Equipment 620 as described above, and the second network device 610 is associated with a second User Equipment 620 as described above. The first network device 610 comprises a receiving unit 612 for receiving the timing information from the first User Equipment 620 and a synchronizing unit 614 for synchronizing its slave clock 310 with respect to the master clock 630 comprised within the first User Equipment 620 based on the timing information received from the master clock 630. The second network device 610 has a receiving unit 612 for receiving the timing information from the second User Equipment 620 and a synchronizing unit 614 for synchronizing its slave clock 310 with respect to the master clock 630 comprised within the second User Equipment 620 based on the timing information received from the second User Equipment 620.

In preferred embodiments, the first network device 610 is configured to communicate with the second network device 610 over a wireless communications network. This wireless communications network may be the wireless communications network of which the wireless communications network node 22 is a part, for example a 3GPP network, or another wireless communications network. The first network device 610 may be configured to send a communication (e.g. data) to (and/or receive a communication from) the second network device 610 via the first User Equipment 620, or for example via another User Equipment (not shown). It may be more cost effective and convenient to use the same User Equipment for synchronization and for communication. However, using for example a separate User Equipment for synchronization and communication purposes is feasible.

A computer program may be configured to, when run on a processor, cause the processor to perform any of the methods described above. The computer program may be provided on a carrier which may be, for example, an electronic signal, an optical signal, a radio signal or a computer readable storage medium.

Thus, embodiments of the present invention have the advantage that clocks at respective network devices in a communications network may be synchronized with each other, within an acceptable error margin, even if the network devices are arranged to communicate wirelessly. Furthermore, by not requiring modifications to the network devices, embodiments of the present invention facilitate upgrade or implementation of such communications networks for wireless communication.

The invention claimed is:

1. A method, performed by a User Equipment, comprising:
   receiving reference signals from a wireless communications network node;
   obtaining a time offset, wherein the time offset is based on the propagation delay of the reference signals;
   setting a master network clock comprised within the User Equipment based on the reference signals and the time offset; and
   sending timing information to a network device having a slave network clock in a communications network using the master clock.

2. The method according to claim 1, wherein the timing information is such that the network device in the communications network can synchronize its slave clock with respect to the master clock comprised within the User Equipment.

3. The method according to claim 1, wherein the master clock is at least one of: a Precision Time Protocol, PTP, network clock; and
   a Precision Time Control Protocol, PTCP, network clock.

4. The method according to claim 1, wherein the timing information comprises one or more time stamps generated by the master clock.

5. The method according to claim 1, wherein sending the timing information to the network device comprises sending the timing information according to a time synchronization protocol specified in IEEE 1588.

6. The method according to claim 1, wherein the reference signals comprise at least one of:
   Primary Synchronization Signals, PSS;
   Secondary Synchronization Signals, SSS;
   Positioning Reference Signals, PRS, and Common Reference Signals, CRS.

7. The method according to claim 1, wherein obtaining the time offset comprises determining the time offset from at least one of:
   location information of the User Equipment; and
   a Timing Advance value specified in TS 36.133.

8. The method according to claim 1, comprising setting the master clock by:
   setting a first time part comprised within the User Equipment based on the reference signals;
   applying the time offset to the first time part; wherein
   the first time part provides a synchronization signal to the master clock.

9. The method according to claim 8, wherein the synchronization signal is an electrical signal comprising one or more synchronization pulses.

10. The method according to claim 8, wherein the first time part maintains time using time units specified by a radio access technology,
    wherein the master clock maintains time using different time units from the first time part.

11. The method according to claim 9, further comprising providing an absolute time reference associated with the electrical signal comprising one or more synchronization pulses to the master clock.

12. A User Equipment comprising:
a master clock;
a receiving unit for receiving reference signals from a wireless communications network node;
an obtaining unit for obtaining a time offset, wherein the time offset is based on the propagation delay of the reference signals;
a setting unit for setting the master clock based on the reference signals and the time offset; and
a sending unit for sending timing information to a network device having a slave clock in a communications network using the master clock.

13. A system comprising:
a User Equipment according to claim 12; and
a network device having a slave clock;
wherein the network device comprises: a receiving unit for receiving the timing information from the User Equipment; and a synchronizing unit for synchronizing its slave clock with respect to the master clock comprised within the User Equipment based on the timing information.

14. The system according to claim 13, wherein the network device is configured according to a PROFINET IO protocol specified in IEC61784-2.

15. A communications network comprising:
a first network device having a first slave clock;
a second network device having a second slave clock;
a first User Equipment according to claim 12; and
a second User Equipment according to claim 12;
wherein the first network device comprises a receiving unit for receiving the timing information from the first User Equipment and a synchronizing unit for synchronizing its slave clock with respect to the master clock comprised within the first User Equipment based on the timing information received from the first User Equipment; and
wherein the second network device comprises a receiving unit for receiving the timing information from the second User Equipment and a synchronizing unit for synchronizing its slave clock with respect to the master clock comprised within the second User Equipment based on the timing information received from the second User Equipment.

16. The communications network according to claim 15, wherein the first network device is arranged to communicate with the second network device over a wireless communications network.

17. A non-transitory computer readable storage medium comprising a computer program configured to, when run on a processor, cause the processor to perform a method comprising:
receiving reference signals from a wireless communications network node;
obtaining a time offset, wherein the time offset is based on the propagation delay of the reference signals;
setting a master network clock comprised within the User Equipment based on the reference signals and the time offset; and
sending timing information to a network device having a slave network clock in a communications network using the master clock.

* * * * *